United States Patent [19]

Harris, Jr.

[11] E Re. 28,917

[45] Reissued July 27, 1976

[54] WIRE UNREELING SYSTEM

[75] Inventor: Marvin E. Harris, Jr., Florence, Ala.

[73] Assignee: Reynolds Metals Company, Richmond, Va.

[22] Filed: Sept. 18, 1975

[21] Appl. No.: 614,365

Related U.S. Patent Documents

Reissue of:

[64] Patent No.: 3,879,978
Issued: Apr. 29, 1975
Appl. No.: 431,084
Filed: Jan. 7, 1974

[52] U.S. Cl. ..... 72/183; 72/79; 72/160; 242/128

[51] Int. Cl.[2] ..... B21F 1/02

[58] Field of Search ..... 242/128; 72/79, 183, 72/160

[56] References Cited

UNITED STATES PATENTS

| | | | |
|---|---|---|---|
| 730,549 | 6/1903 | Mallett | 72/79 |
| 3,101,916 | 8/1963 | Haugwitz | 242/128 |
| 3,655,108 | 4/1972 | Bonnabaud et al. | 242/128 |

*Primary Examiner*—Milton S. Mehr
*Attorney, Agent, or Firm*—Glenn, Lyne, Gibbs & Clark

[57] ABSTRACT

Apparatus for withdrawing wire in an axial direction from a coil, with rotary counter-twist means which is capable of adjustment during operation to vary the ratio of its speed to that of the wire, and which includes a set of bending rolls with combined straightening and back-tension functions.

10 Claims, 8 Drawing Figures

10
36
54
56
70
58
60
46
62
42
44
68
66
64
35
34
48
30
32
28
26
38
24
20
22
52
12
50
16
18
14

WIRE UNREELING SYSTEM

Matter enclosed in heavy brackets [ ] appears in the original patent but forms no part of this reissue specification; matter printed in italics indicates the additions made by reissue.

BACKGROUND OF THE INVENTION

The prior art includes apparatus for withdrawing wire axially from a coil with counter-twist means for preventing kinking of the wire; see Haugwitz U.S. Pat. No. 3,101,916 issued Aug. 27, 1963. *Without such counter-twist means, there may be an objectionable tendency of the loops of wire being removed from the coil to tighten up and kink, but with such counter-twist means this objectionable tendency can be overcome by imparting to the wire, after it is removed from the coil, a twisting force in a sense tending to open up or spread out the loops as they are cast, one by one, off the coil, so that such force in effect opposes the natural tendency of the wire loops to tighten up.* However, the apparatus of that patent has a geared drive system for the counter-twist means which is not adapted to be changed readily when changing from one coil size to another, and which cannot be adjusted during operation to vary the ratio of the speed of rotation of the counter-twist means to the linear speed of the wire. *Instead, the optimum ratio must be determined by trial and error, being generally held down to the minimum value (i.e., the slowest speed of counter-twist rotation) which will successfully suppress the kinking tendency.* To change the speed ratio a new set of gears must be installed, and that evidently would require stopping and either cutting or rethreading the wire. Also, the single small roll around which the wire is initially looped may put even more bend in the wire than it had in the coil from which the wire is fed.

SUMMARY

The present invention provides an improved system for unreeling wire axially, whereby the speed of counter-twisting the wire to offset kinking can be varied relative to the linear speed of the wire during operation of this system. Back-tension is maintained by a set of bending rollers which have a combined frictional and straightening effect. The present invention also provides for adjustment of axial distance between the coil and the first small constriction encountered by the wire while the system is in operation, to further facilitate adjustments during operation of the system, when the effect of the adjustments can best be observed for purposes of obtaining good performance for any one particular kind of wire and coil size which may be handled in the system after some other type of wire or size of coil had been put through the apparatus.

DESCRIPTION OF THE DRAWINGS

The accompanying drawings show a present preferred embodiment of the invention, in which

FIG. 2 is a front elevation of the apparatus shown in FIG. 1;

FIGS. 6, 7 and 8 are side elevations, in reduced scale, showing schematically alternative ways of threading the apparatus.

DESCRIPTION OF ILLUSTRATED EMBODIMENT

Figure 1:
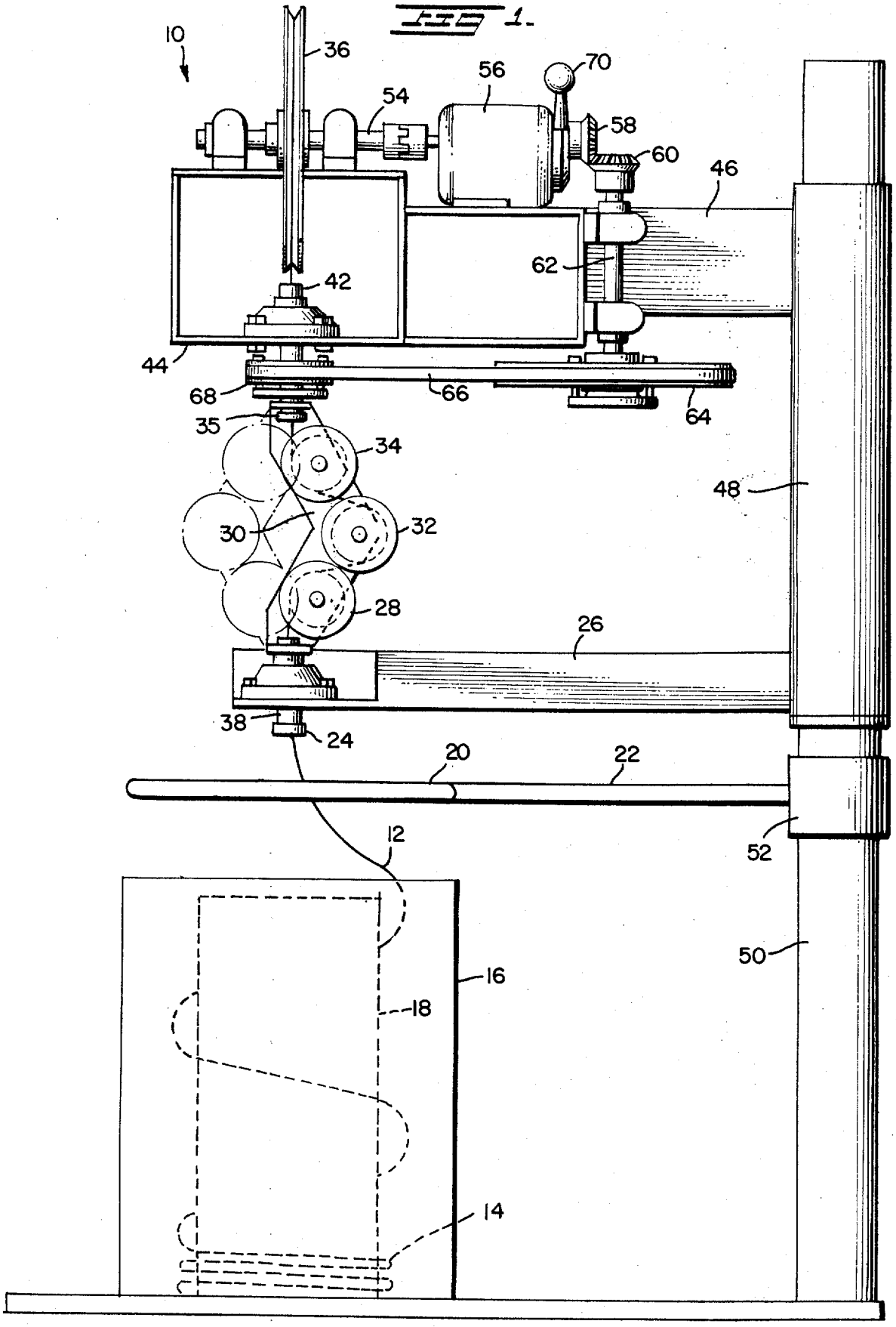
FIG. 1 is a side elevation of apparatus embodying the invention.
Figures 2, 3, 6, 7:
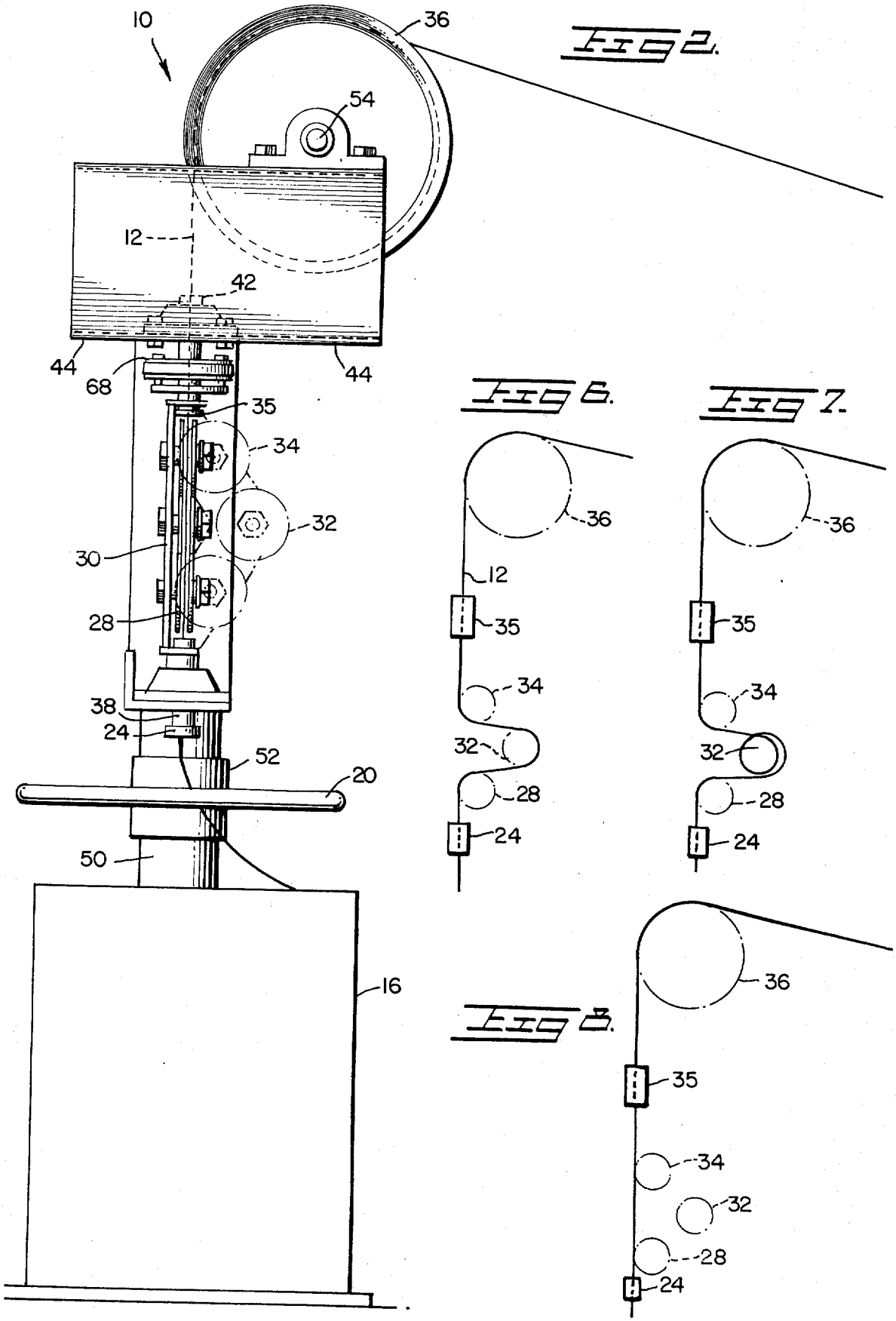
Figure 3:
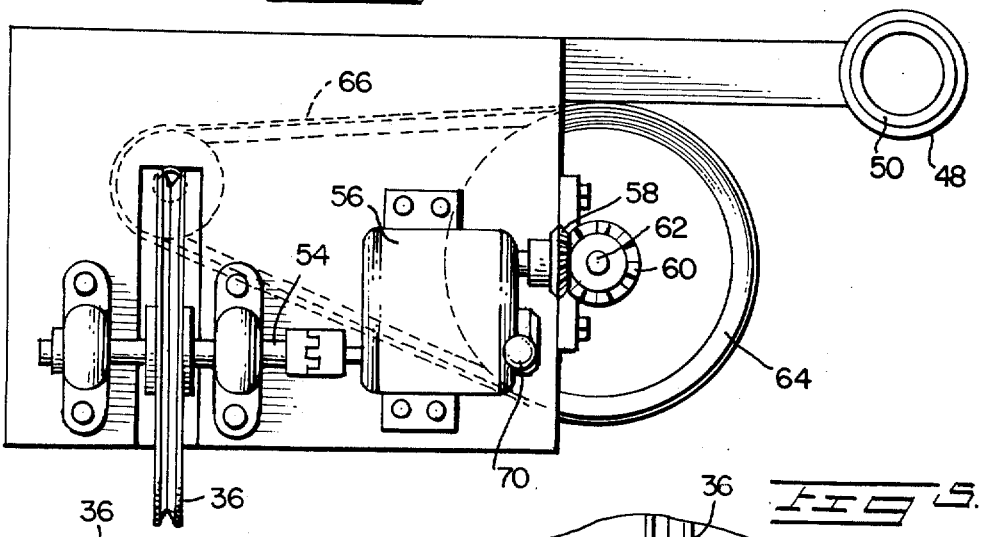
FIG. 3 is a top plan of the apparatus shown in FIG. 1.
Figure 4:
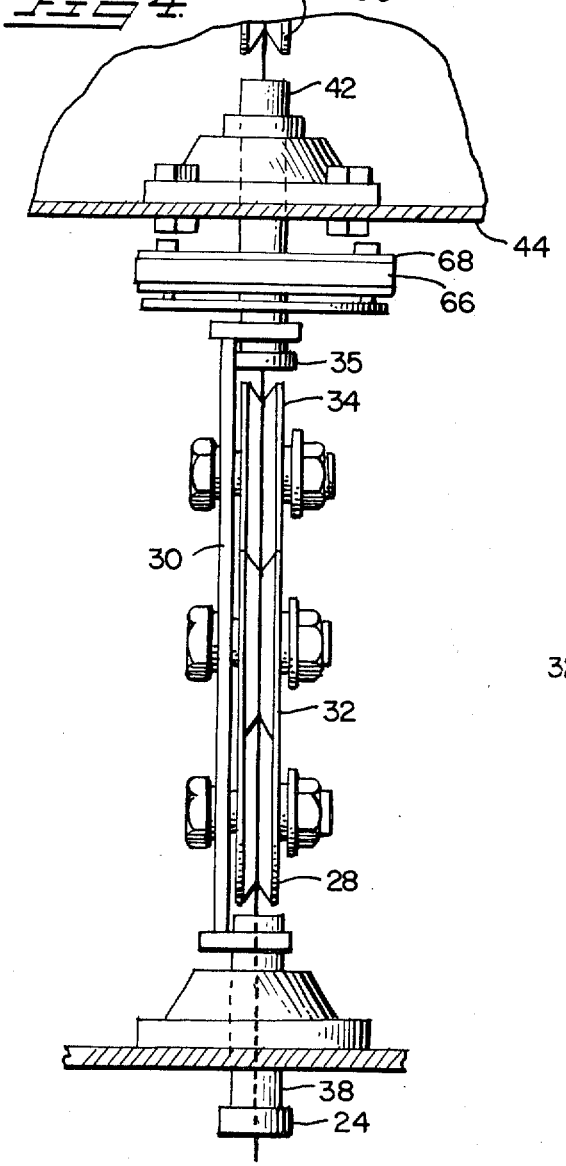
FIG. 4 is an enlarged fragmentary front elevation showing planetary unwinding and bending mechanism of the apparatus of FIG. 1.
Figure 5:
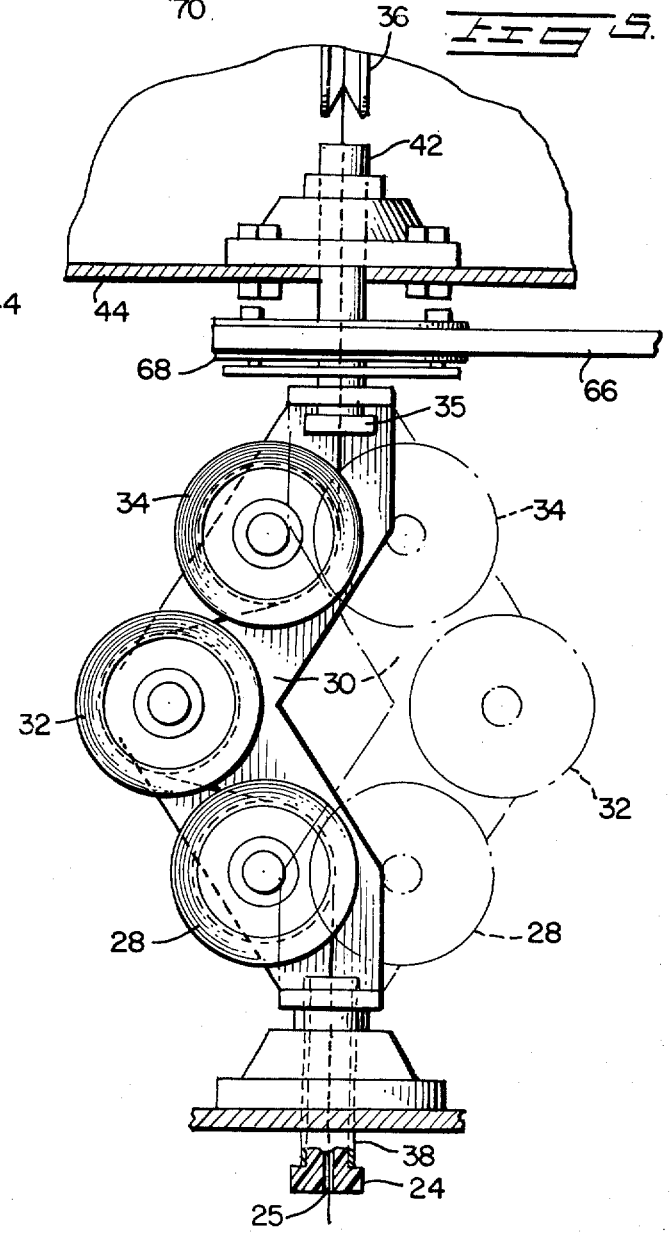
FIG. 5 is a side elevation of the portion of apparatus shown in FIG. 4.

Referring now more particularly to the drawings, and initially to FIGS. 1–2, the illustrated apparatus 10 is adapted to receive a continuous length of wire 12 or other filament, metallic or otherwise, being withdrawn from a coil 14. The coil 14 may be supported in any convenient fashion, open or partially enclosed. For example, it may be contained in a cylindrical container 16 arranged with its central axis aligned vertically and open at the top, so that the wire 12 passes out in a direction generally convergent toward the upward projection of the central axis of the coil. The coil 14 may be positioned around the outside of the bottom end of a cylindrical wall 18 of smaller outer diameter than the inner diameter of the container 16, and concentric therewith. The inner wall 18 limits inward radial movement of the wire 12 before it emerges from the top of the container 16, especially after the coil has been largely unwound and hence the wire 12 has to travel further upwardly through the container 16.

A tubular ring 20 on a vertically adjustable support arm 22 is positioned above the top of the container 16, concentrically therewith, in order to limit the outward ballooning movement of the wire 12 as it passes upwardly from the container 16, especially at wire speeds above 500 feet per minute. The wire 12 next passes upwardly through a guide 24 on a vertically adjustable support arm 26. Guide 24 is of nylon and has a small vertical passage 25 through it. This is the first small constriction which the wire encounters when it is unreeled. The wire 12 passes vertically upwardly through passage 25 to a roller 28 journalled on the middle of the lower leg of a generally L-shaped support 30. The wire 12 takes about a quarter turn around the V-grooved periphery of roller 28 and thence passes almost horizontally to a like V-grooved roller 32 journalled near the apex of the L-shaped support 30. After passing approximately a half turn around the roller 32 the wire 12 moves generally horizontally to a third V-grooved roller 34 journalled near the middle of the upper leg of the L-shaped support 30. The wire 12 passes almost a quarter turn around roller 34, and thence moves vertically upwardly through a guide 35 (like 24) to a wheel 36. After passing a little more than a quarter turn around the V-grooved periphery of wheel 36, the wire 12 is drawn under tension into receiving equipment (not shown), such as a machine where the wire is used in a process of manufacture, or where it may be rewound in a different form.

The opposite ends of the L-shaped support 30 are journalled to permit rotation of the support 30 about an axis aligned with portions of the wire 12 passing vertically upwardly to the roller 28 and from the roller 34. The lower end of the L-shaped support 30 is secured to a hollow shaft 38 journalled on arm 26. The lower end of shaft 38 carries guide 24, and wire 12 passes upwardly through shaft 38 from guide 24 to roller 28. The upper end of L-shaped support 30 is secured to a hollow shaft 42 journalled on a structure 44 supported by an arm 46. The hollow shaft 42 carries guide 35 and surrounds wire 12 as it passes vertically upwardly from roller 34 to wheel 36. The arm 46 and arm 26 are both integrally connected to a vertically adjustable sleeve 48 carried on a fixed vertical post 50. A separate sleeve 52 is also adjustably mounted on the post 50 and it is integrally connected to the arm 22. Since the sleeves 48 and 52 can be moved vertically on post 50 independently of each other, the ring 20 can be adjusted vertically relative to the positions of the guide 24 and container 16, and the guide 24 is similarly adjustable relative to the positions of the ring 20 and container 16. Such adjustments can be made as needed while the apparatus is operating, so that the effects on operation can readily be observed. It would be feasible to mount the guide 24 for vertical movement independently of the various rollers above it, if that should be desirable.

The wheel 36 is keyed on a shaft 54 clutched to the input shaft of a variable ratio drive unit 56, such as an infinitely variable drive system using a belt trained around a pair of cones (not shown). The output shaft of the variable drive unit 56 drives a bevel gear 58 meshing with a bevel gear 60 keyed to a vertical shaft 62 journalled in supports secured to the structure 44 carried on the arm 46. The lower end of the shaft 62 is keyed to a pulley wheel 64 driving a belt 66 which drives a pulley wheel 68 keyed to the hollow shaft 42. The effect of this arrangement is that the frictional engagement of the wire 12 around the wheel 36 is sufficient to rotate the wheel 36 in direct response to linear movement of the wire 12. This movement is transmitted through the variable gear unit 56 to rotate the shaft 42 and thereby to rotate the L-shaped support around its vertical axis of rotation, and thus swing the rollers 28, 32 and 34 around the same axis. *Thus wheel 36, variable ratio drive unit 56, and the other apparatus through which the movement is transmitted constitute, in effect, a variable speed motor drive means.* A lever 70 is operable to change the ratio of the variable ratio gear unit 56 while the wire 12 is passing through the apparatus 10, thus enabling the operator to observe the result as he adjusts to select the best rotational speed of the L-shaped support 30 relative to the rate of linear movement of the wire 12.

The reverse bending of the wire 12 around the successive rollers 28, 32 and 34 has the effect of producing back-drag to tighten the wire 12 around the roller 36 under the influence of tension imposed by the receiving unit (not shown), thus giving wire 12 sufficient frictional grip on wheel 36 to drive wheel 36 and rotate the L-shaped roller support 30. At the same time the reverse bending of wire 12 around rollers 28, 32 and 34 has a straightening effect on the wire 12. This should help to take out some of the curvature resulting from bending of the wire into the coil 14 before the unwinding process begins. While these effects are being felt, the wire is simultaneously being detwisted, in the portions of the wire between the guide 24 and the coil 14, as a result of rotation of the L-shaped roller support 30 on its journals 38 and 40. This rotation is arranged to be in the opposite direction from the twist imparted to the said portion of the wire as it is withdrawn in successive loops from the coil 14, and consequently the tendency of the wire to twist into kinks before reaching the guide 24 can be reduced to a minimum. Optimum results are achieved by adjustment of the ratio of the variable ratio gear drive 56, to suit the particular wire and coil, and any other operating conditions that need to be taken into account.

FIG. 7 shows diagrammatically that the wire 12 may be looped entirely around one of the rollers, such as the roller 32. However, such looping is undesirable because it tends to cause chafing of adjacent portions of the wire looped around the roller, and because the roller, being smaller in diameter than the coil 14, tends to tighten the wire into an even more severe bend than it had when in the original coil 14.

The apparatus 10 can also be used without any untwisting action, by not passing the wire 12 around any of the rollers 28, 32 and 34, as illustrated in FIG. 8 and by adjusting speed handle 70 to zero RPM output. This zero untwisting capability is useful because some products, such as large diameter wire, do not give tangling problems and it may be desirable not to have to impart detwist motion. By using handle 70 to dial RPM to zero, and by-passing rolls 28, 32 and 34, the apparatus becomes a normal overhead sheave payoff unit, which is common in the industry. This conversion can be made without rethreading or cutting the wire.

While a present preferred embodiment of the invention has been illustrated and described, it will be understood that the invention may be otherwise variously embodied and practiced within the scope of the following claims.

What is claimed is:

1. Apparatus for unreeling wire from a coil in a direction along an extension of the axis of the coil which comprises:

a. a first annular constriction through which the wire is initially withdrawn from the coil, b. rotatable means around which the wire is entrained in frictional engagement before it is withdrawn under tension, c. a second annular constriction through which said wire passes after said first annular constriction but prior to being entrained on said rotatable means, d. untwisting means for untwisting the wire located between said first and second annular constrictions, e. and motor drive means for positively driving said untwisting means regardless of the tension on said wire, f. said untwisting means comprising:

1. several rollers about which said wire is entrained to travel in a sinuous path so that said wire is bent first in one direction and then the other, 2. a common support on which said rollers are journaled with said common support being driven by said motor drive means and swung about an axis passing between said first and second annular constrictions, g. said motor drive means being a variable speed means with means for varying said speed independently of the rotation of said rotatable means during the operation of said apparatus.

2. Apparatus according to claim 1, including means for mounting said first annular constriction for adjustment of position relative to the coil of wire.

3. Apparatus according to claim 2, including a ring of larger inside diameter than said first annular constriction, said ring being mounted adjustably in position relative to said first annular constriction and coil.

*4. Apparatus according to claim 1, wherein said motor drive means includes said rotatable means.*

*5. Apparatus according to claim 4, wherein back-drag produced by said untwisting means tightens the wire about said rotatable means for positively driving said untwisting means regardless of the tension on the wire being withdrawn from said rotatable means.*

*6. Apparatus for unreeling wire from a coil in a direction along an extension of the axis of the coil which comprises:*

*a. a first annular constriction through which the wire is initially withdrawn from the coil,*

*b. rotatable means around which the wire is entrained in frictional engagement before it is withdrawn under tension,*

*c. a second annular constriction through which said wire passes after said first annular constriction but prior to being entrained on said rotatable means,*

*d. untwisting means for untwisting the wire located between said first and second annular constrictions,*

*e. and a variable ratio drive unit for driving said untwisting means,*

*f. said untwisting means comprising:*

*1. several rollers about which said wire is entrained to travel in a sinuous path so that said wire is bent first in one direction and then the other,*

*2. a common support on which said rollers are journaled with said common support being driven by said variable ratio drive unit and swung about an axis passing between said first and second annular constrictions,*

*g. said variable ratio drive unit having control means operable while the wire is being unreeled for varying the speed of rotation of said untwisting means about said axis independently of the speed of rotation of said rotatable means.*

*7. Apparatus according to claim 6, including means for mounting said first annular constriction for adjustment of position relative to the coil of wire.*

*8. Apparatus according to claim 7, including a ring of larger inside diameter than said first annular constriction, said ring being mounted adjustably in position relative to said first annular constriction and coil.*

*9. Apparatus according to claim 6, wherein said variable ratio drive unit is connected for being driven by said rotatable means.*

*10. Apparatus according to claim 6, wherein said control means is operable while the wire is being unreeled to change the ratio of said variable ratio drive unit and enables the operator to observe the result of such a change as he adjusts said ratio to select the optimum rotational speed of said untwisting means relative to the rate of linear movement of the wire being withdrawn.*

* * * * *